(12) United States Patent
Tardif et al.

(10) Patent No.: US 9,084,002 B2
(45) Date of Patent: Jul. 14, 2015

(54) HETEROGENEOUS IMAGE SENSOR SYNCHRONIZATION

(75) Inventors: John Tardif, Sammamish, WA (US); Matthew Bronder, Bellevue, WA (US); Yuqun Cao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1319 days.

(21) Appl. No.: 12/772,802

(22) Filed: May 3, 2010

(65) Prior Publication Data

US 2011/0267269 A1 Nov. 3, 2011

(51) Int. Cl.
*H04N 21/41* (2011.01)
*G06F 3/01* (2006.01)
*H04N 21/422* (2011.01)

(52) U.S. Cl.
CPC ............ *H04N 21/4104* (2013.01); *G06F 3/011* (2013.01); *H04N 21/422* (2013.01); *A63F 2300/1093* (2013.01); *A63F 2300/64* (2013.01)

(58) Field of Classification Search
CPC .......................... H04N 21/422; H04N 21/4104
USPC .......................................................... 348/478
See application file for complete search history.

(56) References Cited

U.S. PATENT DOCUMENTS

| | | | |
|---|---|---|---|
| 7,113,203 B1 | 9/2006 | Wu et al. | |
| 7,567,279 B2 | 7/2009 | Yourlo et al. | |
| 2006/0221250 A1 | 10/2006 | Rossbach et al. | |
| 2009/0141146 A1 | 6/2009 | Guidash | |
| 2009/0147238 A1 | 6/2009 | Markov et al. | |
| 2009/0278951 A1 | 11/2009 | Loose et al. | |
| 2011/0157318 A1* | 6/2011 | Nalibotski | 348/47 |
| 2011/0249086 A1* | 10/2011 | Guo et al. | 348/14.12 |

OTHER PUBLICATIONS

Kim, "Design and Calibration of a Multi-View TOF Sensor Fusion System", In Computer Vision and Pattern Recognition Workshops, 2008. CVPRW apos;08. IEEE Computer Society Conference, Jun. 2008, pp. 1-7.
Kushwaha, "Target Tracking in Heterogeneous Sensor Networks Using Audio and Video Sensor Fusion", In IEEE International Conference on Multisensor Fusion and Integration for Intelligent Systems, Seoul, Aug. 2008, pp. 14-19.
Toyama, Kentaro, et al., "Probabilistic Tracking in a Metric Space," Eighth International Conference on Computer Vision, Vancouver, Canada, vol. 2, Jul. 2001, 8 pages.

* cited by examiner

*Primary Examiner* — Sath V Perungavoor
*Assistant Examiner* — James Pontius
(74) *Attorney, Agent, or Firm* — Miia Sula; Judy Yee; Micky Minhas

(57) ABSTRACT

A computer implemented method for synchronizing information from a scene using two heterogeneous sensing devices. Scene capture information is provided by a first sensor and a second sensor. The information comprises video streams including successive frames provided at different frequencies. Each frame is separated by a vertical blanking interval. A video output comprising a stream of successive frames each separated by a vertical blanking interval is rendered based on information in the scene. The method determines whether an adjustment of the first and second video stream relative to the video output stream is required by reference to the video output stream. A correction is then generated to at least one of said vertical blanking intervals.

15 Claims, 11 Drawing Sheets

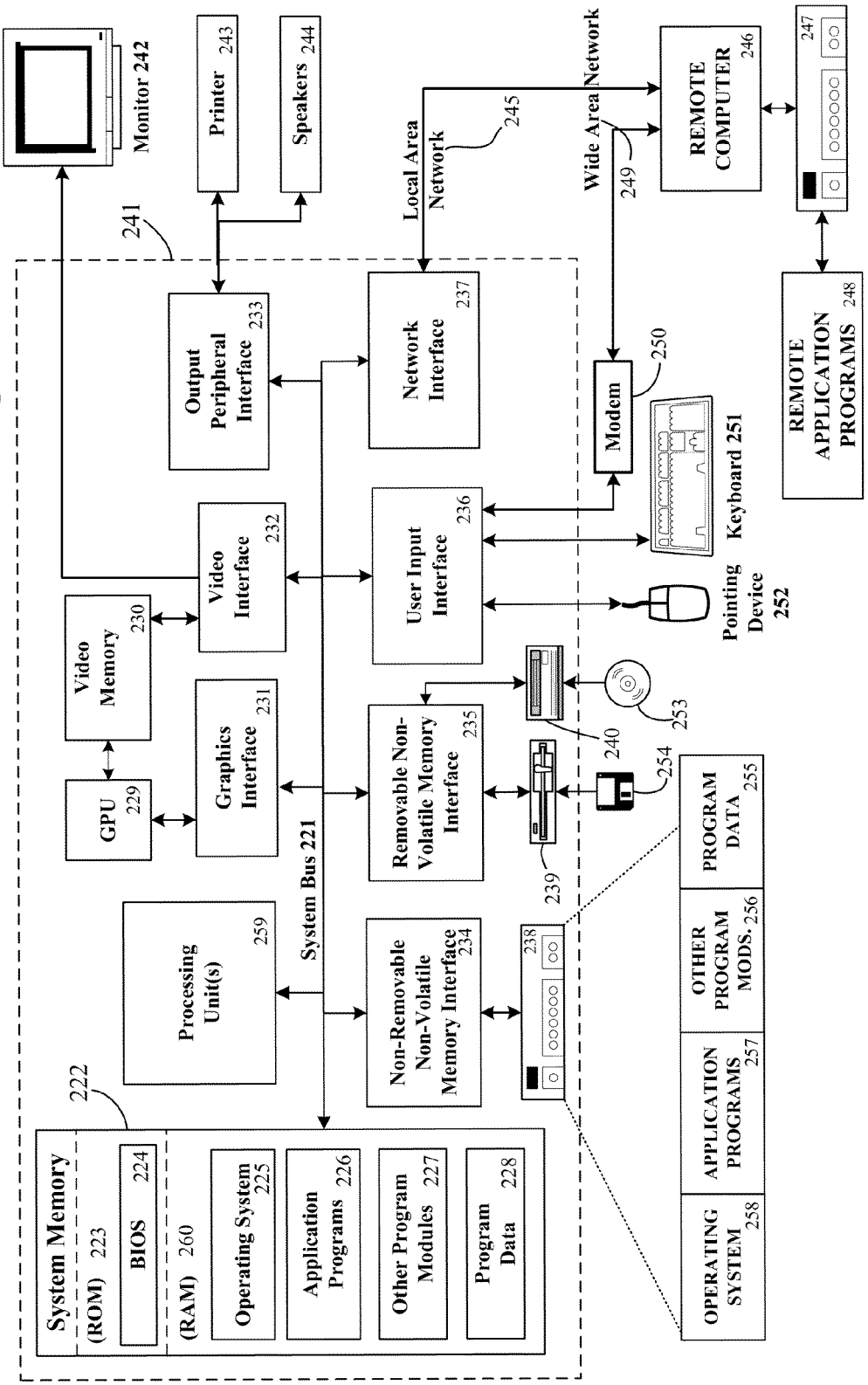

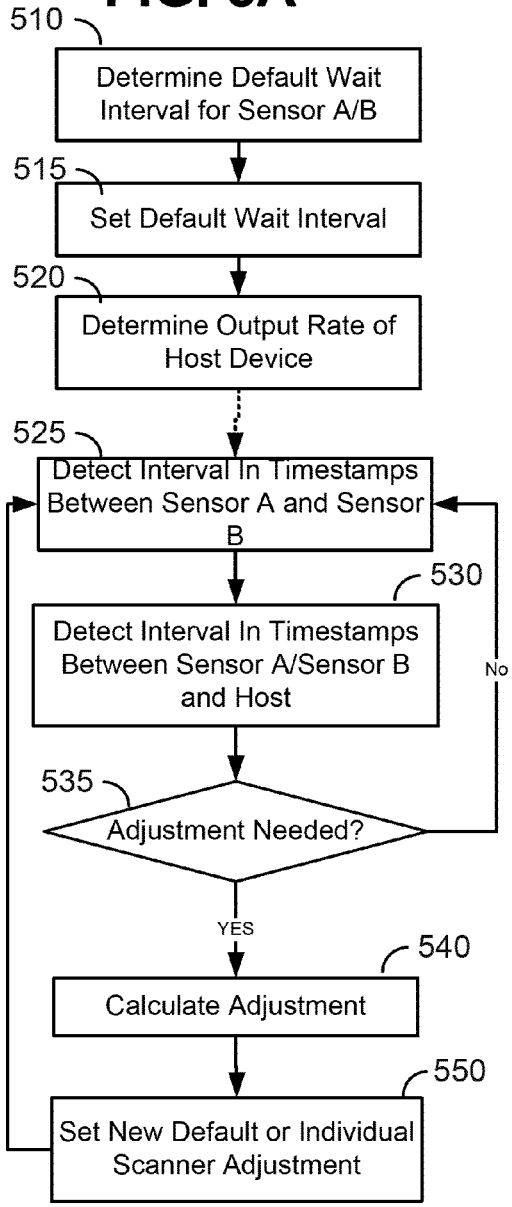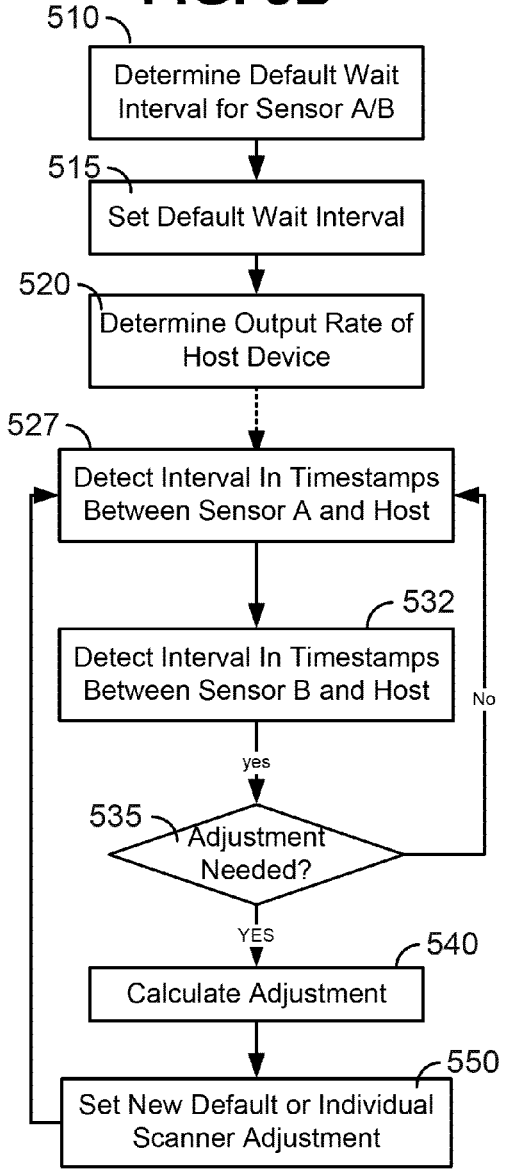

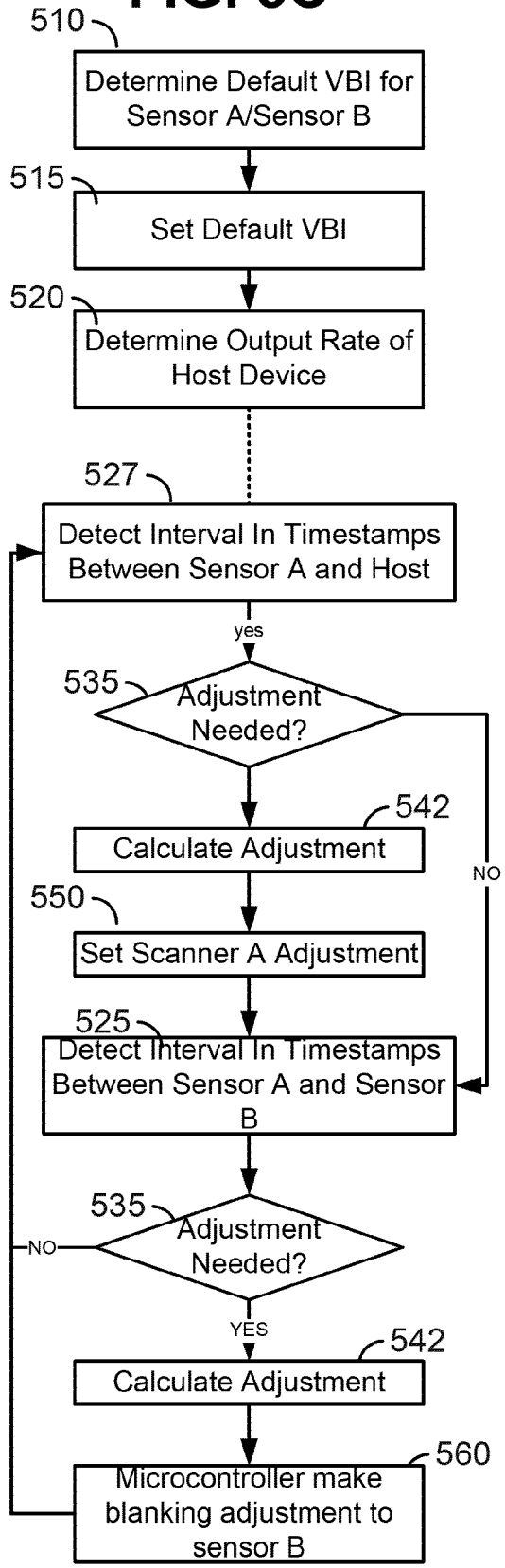

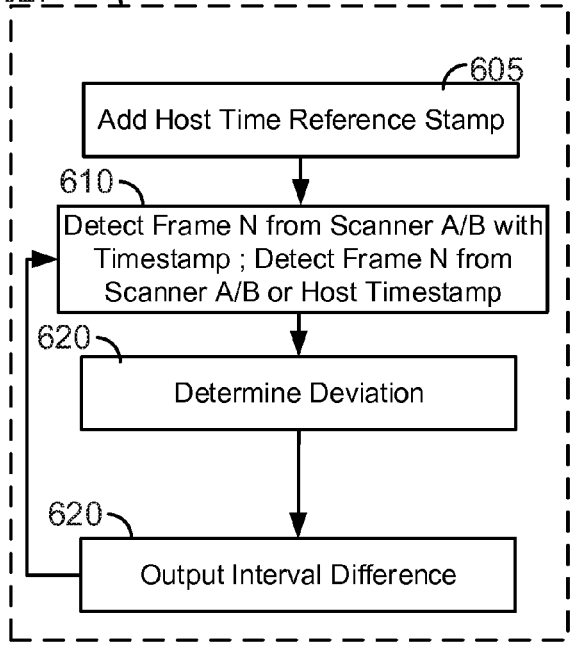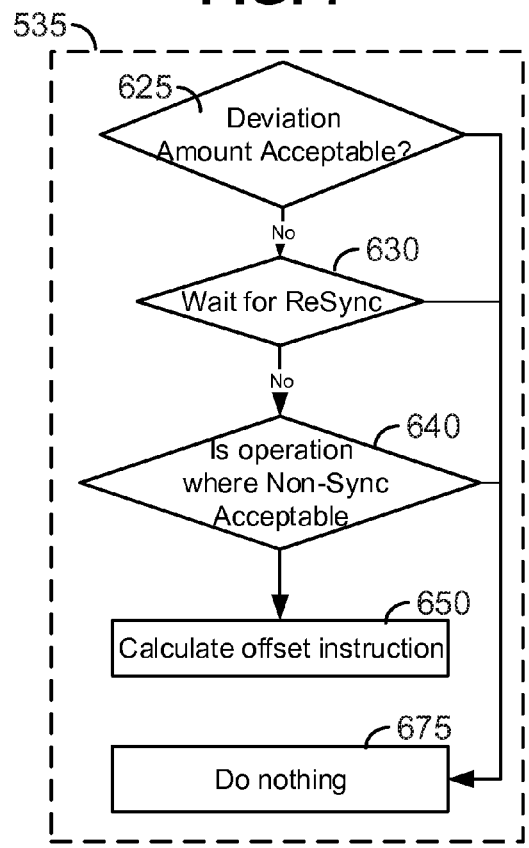

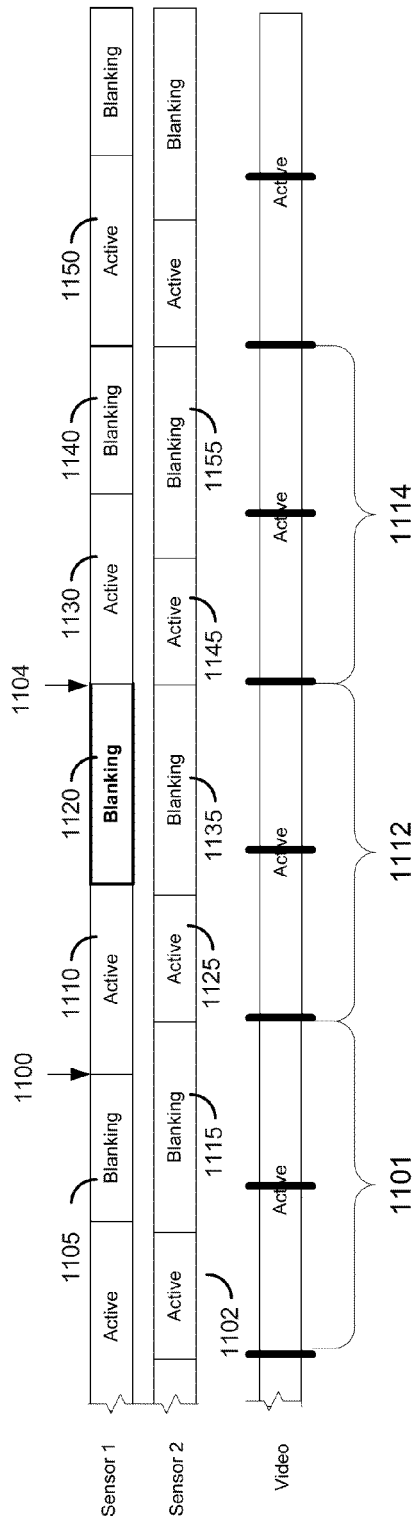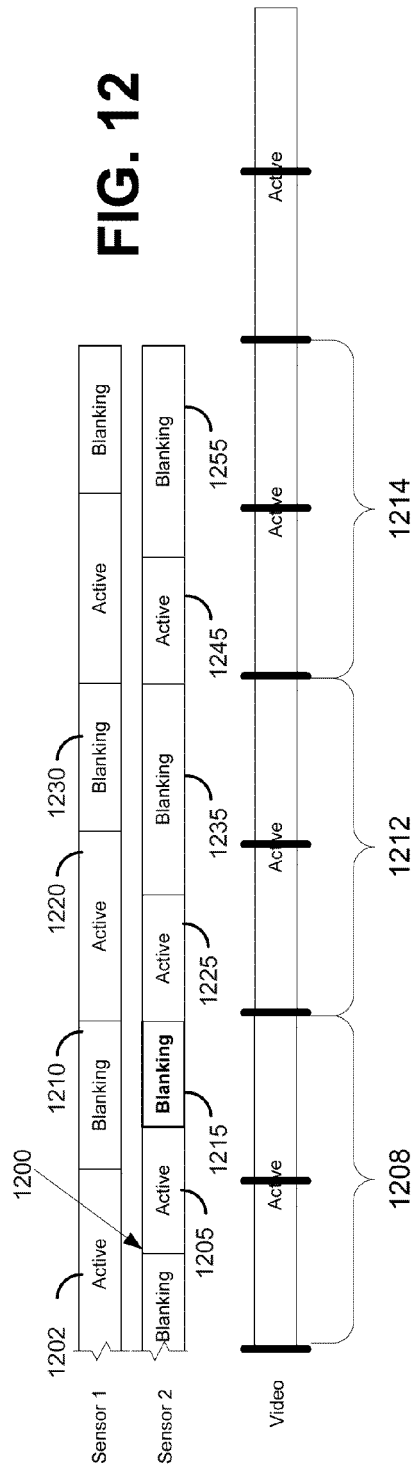

HETEROGENEOUS IMAGE SENSOR SYNCHRONIZATION

BACKGROUND

Systems have been disclosed that utilize multiple image sensors, such as cameras, to detect motion for purposes of controlling a computer interface, such as a game. Typically, such systems use cameras that have tightly synchronized refresh rates to enable them to correlate the data in a scene that the cameras are inspecting and reduce latency between the input detected and the output.

Scene detection performed by multiple cameras includes an output of each camera which may comprise a series of data frames received by a processing unit. Typically the processing unit uses the detected information to generate an output. Such systems focus on maintaining the synchronization between the frame capture of the cameras relative to each other.

One issue with video sensors is that such sensors typically time themselves and cannot be slaved to an external signal. When capturing video, such sensors attempt to avoid flicker due to external light sources which places limitations on exposure time and performing other automatic gain control algorithms precludes use of an external timing control signal.

SUMMARY

Technology is provided which allows heterogeneous image sensors, such as cameras, used in a tracking and rendering system, to maintain synchronization with each other and with an output of the rendering system. Multiple sensors detect information in a scene and output time stamped information to the rendering system. Information from the sensors is used to determine whether the sensors are in sync with each other. When frame information is received by the rendering system, a system reference, such as a timestamp of the video output of the system, is attached to the input frame. Synchronization between the input of each of the sensors relative to each other is provided. Control over the sensor input rates relative to the system reference is also provided by modifying a wait interval, such as a vertical blanking interval, of one or both sensors. A one-time adjustment to the wait interval of one or both of the sensors and/or a permanent change of the default value of the wait interval of one or both sensors can be used to control such synchronization.

In one aspect, the technology provides a computer-implemented method for correlating information from a scene using two heterogeneous image sensing devices. A first sensor and a second sensor provide scene capture information. The information comprises a data stream including successive frames provided at different frequencies. An output comprising a stream of successive frames each separated by an interval is rendered based on information in the scene. The method determines whether an adjustment of the first and second data stream relative to the output stream is required by reference to a processing rate of the output stream. A correction is then generated to at least one of said wait intervals.

BRIEF DESCRIPTION OF THE DRAWINGS

FIG. 4 illustrates a second example embodiment of a computing system that may be used to track motion and update an application based on the tracked motion.

FIG. 5 is a flowchart illustrating a method which may be implemented by the devices illustrated in FIGS. 1-4 to execute an application.

FIG. 6 is a flowchart illustrating a method for determining whether two frames received from heterogeneous image sensor devices are in sync.

FIG. 7 is a flowchart illustrating a method for determining whether to apply a correction to two heterogeneous scanners when such scanners are out of sync.

FIG. 11 is a flowchart illustrating insertion of a lengthened correction interval into the wait interval of a scanner.

FIG. 12 is a flowchart illustrating insertion of a shortened correction interval into the wait interval of a scanner.

DETAILED DESCRIPTION

Technology is provided for a image sensor device synchronization and rendering system wherein heterogeneous sensors used as input to the system are maintained in synchronization with each other and with an output to the rendering system. Multiple sensors output time stamped information on a scene. Information from the sensors is used to determine whether the sensors are in sync with each other. When frame information is received by the rendering system, a system reference, such as a timestamp of the video output of the system, is attached to the input frame. Synchronization between the input of the sensors and control over the sensor input rate and arrival relative to the system reference is provided by modifying the vertical blanking interval of one or both sensors. A one-time adjustment to the vertical blanking interval of one or both of the sensors, and/or a permanent change of the default value of the vertical blanking interval of one or both of the sensors can be used to control such synchronization. The technology may be used in a motion capture device or any system where there is a need to synchronize video captures of different resolutions (i.e. 480p, 720p, 1080p) for multi-view applications. For purposes of illustration, the technology will be described in relation to a motion capture system which may be used for gaming and other applications. However, it should be understood that the technology has broader applicability to synchronization of heterogeneous image capture devices.

The technology provides the ability to synchronize an input sensor, such as a camera, with vertical sync tracking a rendering system's output video timing. This provides an advantage that a one-time delay of camera capture can be used to compensate for a dropped video output frame. Additionally, the technology avoids having to have the rendering systems software intimately tied to sensor timing and implementation. The system further provides an advantage that lower frequency sensor timings can be used.

Figure 1:
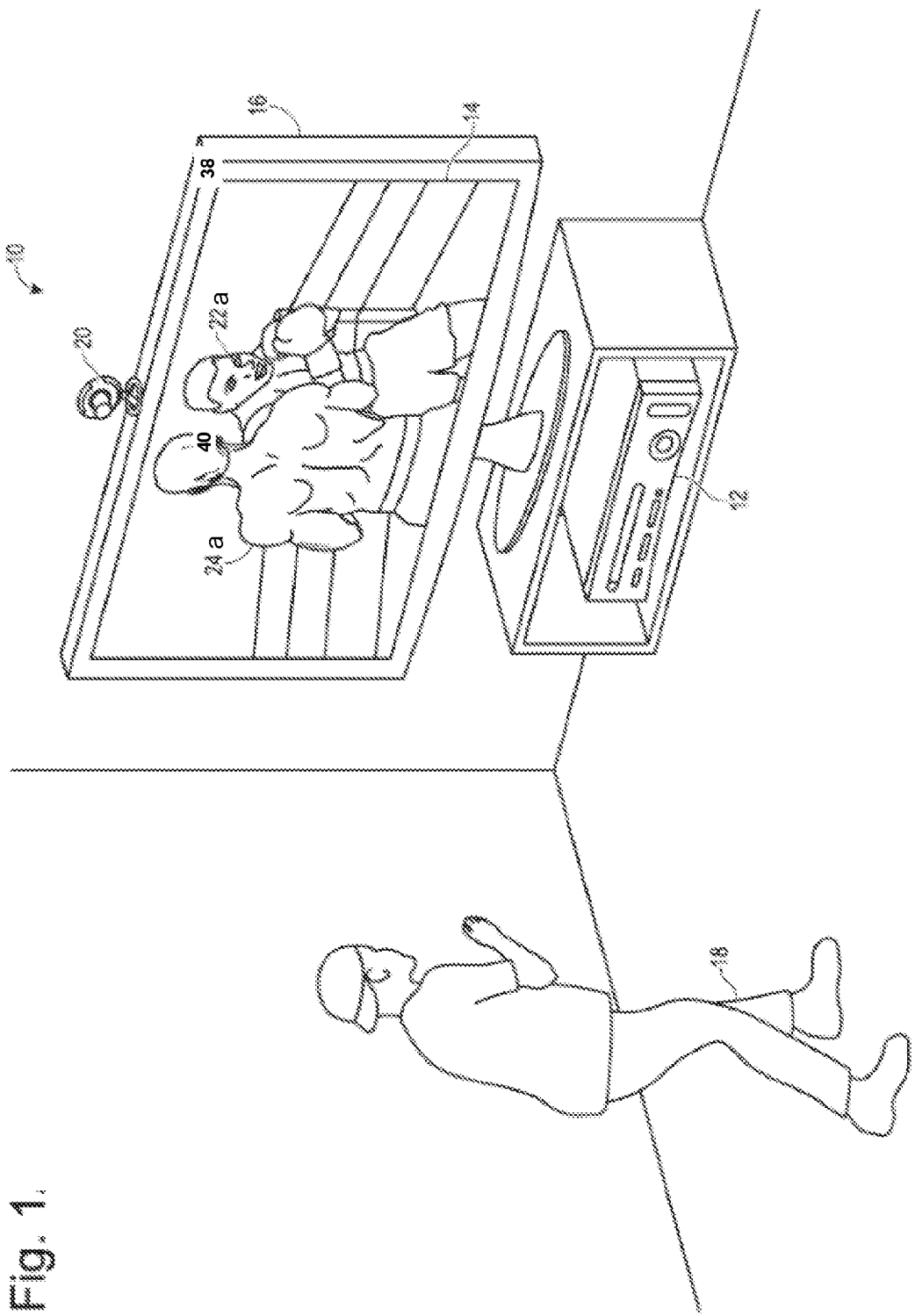
FIG. 1 illustrates an example embodiment of a tracking system with a user playing a game.

FIG. 1 illustrates an example embodiment of a system 10 which can be used with the present technology. One use of the exemplary tracking and rendering system 10 is where a user 18 plays a game. In FIG. 1 the example is the user playing a boxing game. In an example embodiment, the system 10 may be used to recognize, analyze, and/or track a human target such as the user 18 or other objects within range of tracking system 10.

As shown in FIG. 1, tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1, tracking and rendering system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within the application and/or animate an avatar or on-screen character, as will be described in more detail below.

According to one embodiment, the tracking and rendering system 10 may be connected to an audio/visual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audio/visual signals associated with the game application, non-game application, or the like. The audio/visual device 16 may receive the audio/visual signals from the computing system 12 and may then output the game or application visuals and/or audio associated with the audio/visual signals to the user 18. According to one embodiment, the audio/visual device 16 may be connected to the computing system 12 via, for example, an S-Video cable, a coaxial cable, an HDMI cable, a DVI cable, a VGA cable, component video cable, or the like.

As shown in FIG. 1, the system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character. Similarly, tracking system 10 may be used to recognize, analyze, and/or track persons who are watching user 18 play the game so that movement by those persons watching user 18 play the game will control movement avatars in the audience at the boxing game displayed on audio/visual device 16.

In the example depicted in FIG. 1, the application executing on the system 10 may be a boxing game that the user 18 is playing. For example, the computing system 12 may use the audio/visual device 16 to provide a visual representation of a boxing opponent 22a to the user 18. The computing system 12 may also use the audio/visual device 16 to provide a visual representation of a user avatar 24 that the user 18 may control with his or her movements. For example, the user 18 may throw a punch in physical space to cause the user avatar 24 to throw a punch in game space. Thus, according to an example embodiment, the computer system 12 and the capture device 20 recognize and analyze the punch of the user 18 in physical space such that the punch may be interpreted as a game control of the user avatar 24 in game space and/or the motion of the punch may be used to animate the user avatar 24 in game space.

According to other example embodiments, the system 10 may further be used to interpret target movements as operating system and/or application controls that are outside the realm of games. For example, virtually any controllable aspect of an operating system and/or application may be controlled by movements of the target, such as the user 18.

Suitable examples of a system 10 and components thereof are found in the following co-pending patent applications, all of which are hereby specifically incorporated by reference: U.S. patent application Ser. No. 12/475,094 entitled "Environment And/Or Target Segmentation", filed 29 May 2009 and hereby fully incorporated herein by reference; U.S. patent application Ser. No. 12/511,850, entitled Auto Generating a Visual Representation, filed 29 Jul. 2009, fully incorporated herein by reference; U.S. patent application Ser. No. 12/474,655, "Gesture Tool" filed on May 29, 2009, and hereby fully incorporated herein by reference; U.S. patent application Ser. No. 12/603,437, "Pose Tracking Pipeline," filed on Oct. 21, 2009. (hereinafter referred to as the '437 Application), and hereby fully incorporated herein by reference; U.S. patent application Ser. No. 12/475,308, "Device for Identifying and Tracking Multiple Humans Over Time," filed on May 29, 2009, and hereby fully incorporated herein by reference; "Motion Detection Using Depth Images," filed on Dec. 18, 2009, and hereby fully incorporated herein by reference; and U.S. patent application Ser. No. 12/575,388, "Human Tracking System," filed on Oct. 7, 2009, and hereby fully incorporated herein by reference; U.S. patent application Ser. No. 12/422,661, "Gesture Recognizer System Architecture," filed on Apr. 13, 2009 and hereby fully incorporated herein by reference; U.S. patent application Ser. No. 12/391,150, "Standard Gestures," filed on Feb. 23, 2009 and hereby fully incorporated herein by reference; and U.S. patent application Ser. No. 12/474,655, "Gesture Tool" filed on May 29, 2009, and hereby fully incorporated herein by reference.

Figure 2:
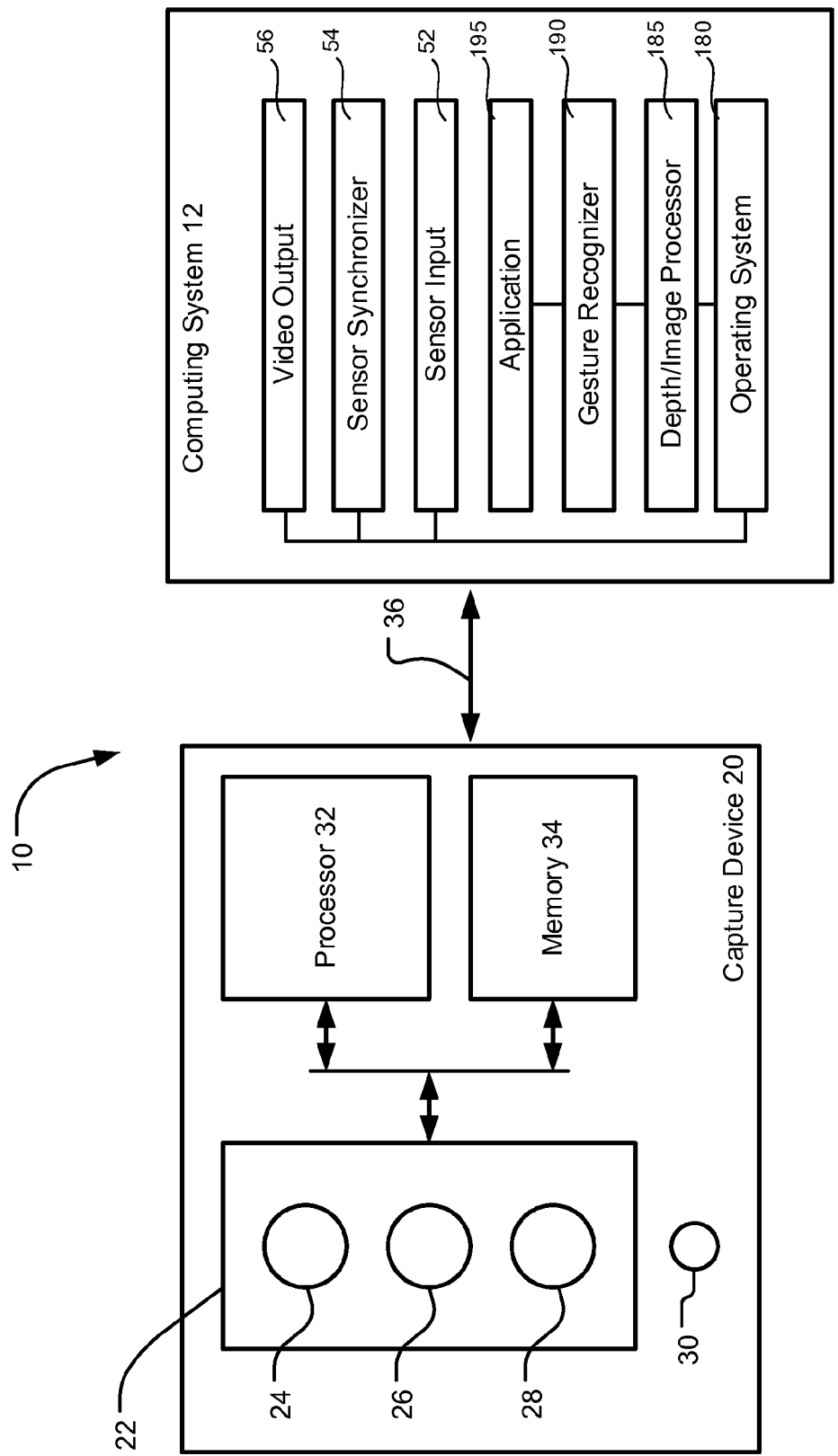
FIG. 2 illustrates an example embodiment of a capture device that may be used as part of the tracking system.

FIG. 2 illustrates an example embodiment of a capture device 20 that may be used for target recognition, analysis, and tracking in a scene, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a first sensor such as a three-dimensional (3-D) camera 26, and a second sensor such as an RGB camera 28 that may be used to capture the depth image of a scene. Each of these components is focused on a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the a 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras or sensors that may view a scene from different angles, to obtain visual stereo data that may be resolved to generate depth information.

In another example embodiment, the capture device 20 may use point cloud data and target digitization techniques to detect features of the user.

The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor or microcontroller 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the microcontroller 32, images or frames of images captured by the 3-D camera 26 or RGB camera 28, or any other suitable information, images, or the like. According to an example embodiment, the memory component 34 may include random access memory (RAM), read only memory (ROM), cache, Flash memory, a hard disk, or any other suitable storage component. Together, the microcontroller 32 and memory may be collectively referred to as a microcontroller.

As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor.

Figure 3:
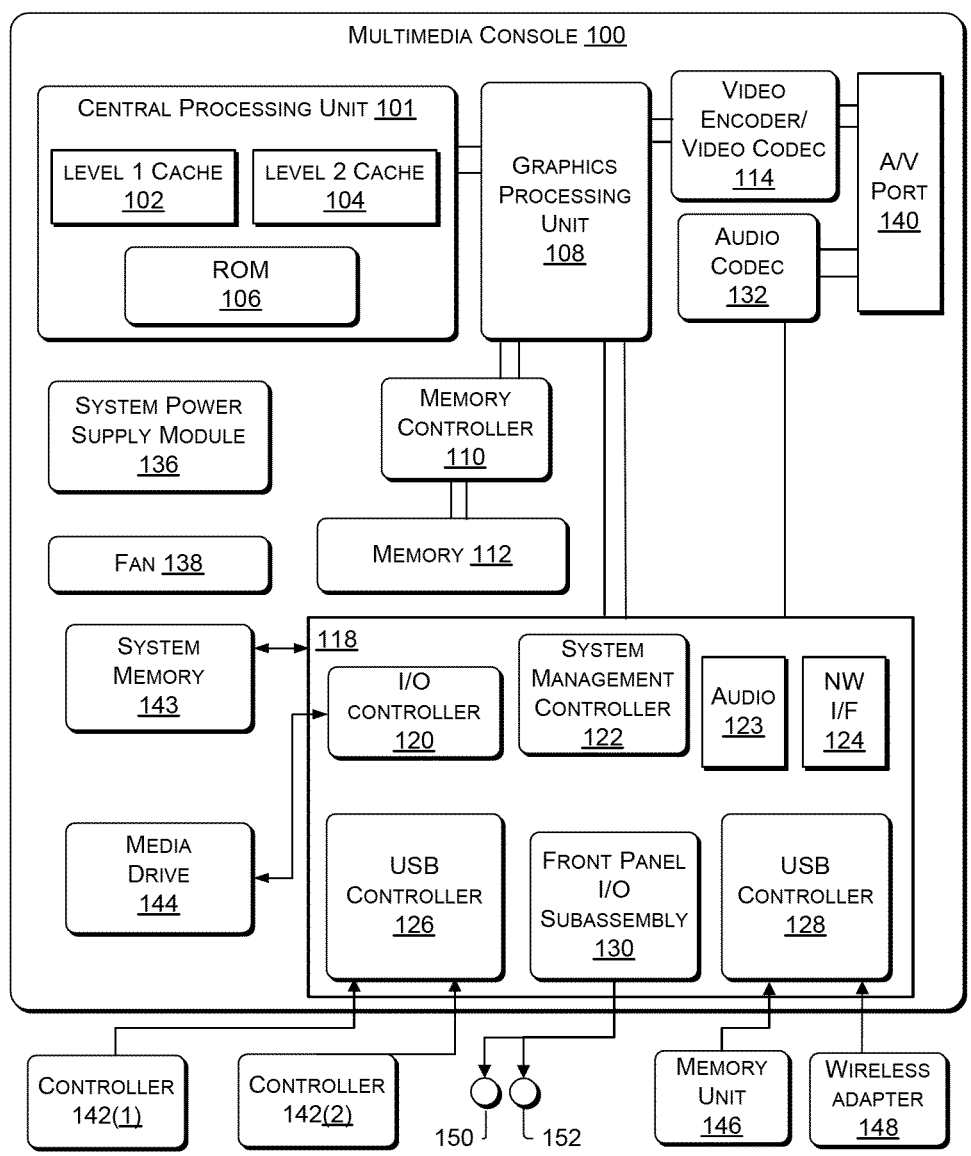
FIG. 3 depicts an example of a processing device that may be used to track motion and execute an application based on the tracked motion.

Computing environment 12 may include components such as those illustrated in FIGS. 3 and 4 to enable operation of applications, such as the boxing application illustrated in FIG. 1 thereon. Illustrated logically in FIG. 2 are a sensor input 52, a sensor synchronizer 54 and a video output 56. Also illustrated are an operating system 180, depth/image processing module 185, gesture recognition engine 190, and an application 195. Depth image processing module 185 uses the depth images to track motion of objects, such as the user and other objects. To assist in the tracking of the objects, depth image processing and object reporting module 194 a gesture recognition engine The gestures recognizer 190 may include a collection of gesture filters, each comprising information concerning a gesture that may be performed by the skeletal model (as the user moves). The recognizer 190 may compare the data captured by device 20 in the form of the skeletal model and movements associated with it a gesture library 192 to identify when a user (as represented by the skeletal model) has performed one or more gestures. Those gestures may be associated with various controls of an application 195.

In one embodiment, depth image processing and object reporting module 185 will report to operating system 180 an identification of each object detected and the location of the object for each frame. Operating system 180 will use that information to update the position or movement of an avatar or other images in the display or to perform an action on the provided user-interface.

Information is provided to the depth image processor 185 by sensor input 52 and sensor synchronizer 54. The elements in FIG. 2 within computing system 12 may be enabled by one or more hardware components and a processor which is specifically programmed to execute instructions to accomplish the techniques described herein.

Sensor input 52 receives data of a scene which includes data representative of the target in a physical space, via the capture device 20. Depth/image processing module 185 provided in the computing environment that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

Video output 56 provides a rendering of the output of an application being used on computing device 12. The video output 56 will comprise a stream of frames comprising a stream of unique consecutive images at a given frame rate. The frame rate produces by the video output will be constant for the output, but may include missed frames in certain cases. The wait interval or vertical blanking interval (VBI) is the time difference between the last active (or visible) line of one frame or field of a raster display, and the first active (or visible) line of the next. During the wait interval the incoming data stream is not displayed on the screen. Missed frame or successive missed frames may result from any number of errors. Application processing peaks may overwhelm the processing hardware during peak action sequences in a game application, for example.

In an embodiment, the capture device 20 via the 3-D camera 26 and/or the RGB camera 28 detects information on a scene. Each of the sensors may provide information in a series of data (or image) frames separated by a wait interval. Commercial embodiments of such devices may include one or more programmable registers accessible by the computing device 12 and/or microcontroller 32 to set adjustable parameters (such as the capture rate and the wait interval) as well as retrieve data from the sensors. When a sensor is initialized, a default frame rate is selected. Generally each frame will comprise an active period and a wait interval period.

Each of the sensors may have a different capture rate and hence are generally referred to as heterogeneous. However, information on the scene that is provided to the computing environment 12 for processing by an application and generating a video output must be synchronized in order for the feedback provided to the user to be accurate.

Latency may also be introduced during processing. In general, information detected in a scene, such as a punch thrown by a user 18, should be transmitted to the video output as quickly as possible to provide realistic feedback to the user. Excessive preprocessing can result in a noticeable delay between player commands and computer feedback, even when a full frame rate is maintained, often referred to as input lag. Latency can also be introduced when synchronization between input devices is not maintained.

More information about recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. Both of which are incorporated by reference herein in their entirety.

As used herein, a computing environment 12 may refer to a single computing device or to a computing system. The computing environment may include non-computing components. The computing environment may include a display device, such as display device 14 shown in FIG. 1. A display device may be an entity separate but coupled to the computing environment or the display device may be the computing device that processes and displays, for example. Thus, a computing system, computing device, computing environment, computer, processor, or other computing component may be used interchangeably.

FIG. 3 illustrates an example embodiment of a computing system that may be the computing system 12 shown in FIGS. 1A-2 used to track motion and/or animate (or otherwise update) an avatar or other on-screen object displayed by an application. The computing system such as the computing system 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio user or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100 via USB controller 126 or other interface.

FIG. 4 illustrates another example embodiment of a computing system 220 that may be used to implement the computing system 12 shown in FIGS. 1-2 to track motion and/or animate (or otherwise update) an avatar or other on-screen object displayed by an application. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates application programs 248 as residing on memory device 247. It will be appreciated that the network connections shown are exemplary and other means of establishing a communications link between the computers may be used.

Either of the systems of FIG. 3 or 4, or a different computing system, can be used to implement Computing System 12 of FIG. 2. As explained above, computing system 12 determines the motions of the users and employs those detected motions to control a video game or other application. For example, a user's motions can be used to control an avatar and/or object in a video game. In some embodiments, the system can simultaneously track multiple users and allow the motion of multiple users to control or effect the application.

The system will use the RGB images and depth images to track a user's movements. For example, the system will track a skeleton of a person using a depth images. There are many methods that can be used to track the skeleton of a person using depth images. One suitable example of tracking a skeleton using depth images is provided in U.S. patent application Ser. No. 12/603,437, "Pose Tracking Pipeline," filed on Oct. 21, 2009. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model with the data and create a skeleton. The skeleton will include a set of joints and connections between the joints.

In one embodiment, in order for a user's motion to be used to control an application the user must first be enrolled or bound to the application. In one embodiment, each user will be asked to identify himself or herself by standing in front of the system so that depth images and/or visual images can be obtained from multiple angles for that user. For example, the user may be asked to stand in front of the camera, turn around, and make various poses while depth images and visual images are obtained. After the system obtains enough depth and/or visual images, the system will create a set of identifying data from the images that uniquely identifies the user. The system will create a unique identification and associate that unique identification with on-screen representation (e.g., avatar) or other object in the game/application. After a user is enrolled in (or bound to) the application, the system will track the motion of that user while the user is actively engaged with the application (e.g., playing the game or using the application). However, in the past, other people in the room who are not actively engaged with the application, (e.g., not bound to application, bound to application but not playing current game, or bound to application but currently not having a turn to play) do not have a way to interact with the application.

FIG. 5 is a flowchart illustrating a method performed by the present technology for synchronizing heterogeneous sensors. The technology is described in relation to two heterogeneous sensors, Sensor A and Sensor B. It will be understood that the technology may apply to any type of sensor but in the present application will be described in relation to two image sensors, such as the RGB camera and the depth camera described with respect to FIG. 2. Where alternative types of heterogeneous sensors are provided, a 'wait interval', similar to the vertical blanking interval in cameras, may be defined by a time between sensor acquisition intervals.

Briefly, as frames of scene information are captured and generated by each respective sensor A and sensor B, they are time stamped by the microcontroller and transmitted over the communications link to the computing device 12. The timestamps may be correlated to each other by the microcontroller by adding a common reference time kept by the microcontroller or though some other correlation mechanism. In the computing device, incoming frame time stamps are checked to see if the sensors are in sync. If the sensors are not in sync, the computing device has the option to increase or decrease the vertical blanking interval of either sensor in order to restore sync. In accordance with the technology, as frames are received by the computing device 12, they are again marked with a time stamp generated by a local time reference, such as a local clock on the computing device 12, and in one embodiment, a time stamp that is tied to the video output timing of the video output generator 52. This allows at least two forms of control over the sensor synchronization. In one embodiment, sensor input is tied to synchronization between the sensors, and in another embodiment, the sensor input is tied to a timing reference in the host. This allows the host to control the rate at which frames are received by adjusting the vertical blanking interval. For example, if the computing device needs to have frames come in sooner, such as, for example, to avoid buffer underflows, it can send a command to the sensors to reduce the default blanking interval for both sensors. If the host needs to have the frame come in later, to avoid buffer overflows, for example, it can increase the vertical blanking interval for both sensors. If the computing device determines that the output frame has been missed or skipped, it can adjust the vertical blanking interval to increase blanking time by a fraction of frame times (such as, for example, 1/N or N is the integer of multiple video output frames divided by the camera input frame rate) for one rendered frame. Typically, synchronization between sensors and video frames may have the start of the active periods offset from one another by a constant target amount.

As illustrated in FIGS. 5A-5C, one or more methods for synchronizing heterogeneous sensors are provided in accordance with the present technology. In one embodiment, shown in FIG. 5A, sensors are checked relative to each other and a host reference. In a second embodiment, both sensors are checked relative to a host reference as shown in FIG. 5B. In a third embodiment, one sensor is correlated to and adjusted by the host reference, and a microcontroller adjusts a second sensor as necessary to synchronize the second sensor relative to the first sensor (and thereby indirectly relative to the host).

With reference to FIG. 5A, at 510, each sensor will have a default wait or vertical blanking interval set for it by the computing device 12. As noted above, commercial embodiments of sensors suitable for capturing a scene are controlled by data registers accessible to the microcontroller. Setting a default wait interval comprises instructing the microcontroller to generate a write to the appropriate data register for the sensor to establish a default value. At step 515, the default wait interval for each sensor is set by the microcontroller. At 520, the output rate of the host device is determined. In one embodiment, the output rate is the video output rate of the video generator 56. As frames are received by the computing device, and in particular, the sensor synchronizer 54, any change in the interval between the frames of two sensors, sensor A and sensor B, will be detected at 525. At 525, a comparison of timestamps for a given frame number of each respective sensor can be made to determine whether the difference between the two values is acceptable. The heterogeneous nature of the sensors means sensor 'intervals' will differ by some amount to maintain their respective periods given different acquisition times. At 530, as input frames are received by the host, frames are time stamped. At 530, a comparison of timestamps between each sensor and the host can be made to determine whether the difference between either sensor value and the host value is acceptable. At 535, using the aforementioned intervals, a determination is made as to whether an adjustment is necessary. There may be instances, described below with respect to FIG. 7, where adjustment is not necessary. If at 535 an adjustment is necessary, then at 540, a best adjustment is calculated. The best adjustment may be a one time interval change in the wait interval of one or both of the sensors, inserted to re-sync the frames relative to each other. An adjustment to the default wait interval may be the best adjustment. The adjustment chosen may be based on how quickly the adjustment can be applied, the simplicity of the adjustment, or other factors. At 550, if an adjustment of the input streams is necessary relative to the host device, adjustments may be made by altering the wait interval of one or both of the sensors, setting a new default wait interval for one or both of the sensors, or making a one-time or default adjustment to the video output stream wait interval. If no adjustment is necessary at 535, detection continues at 525.

FIG. 5B is similar to FIG. 5A and like reference numerals represent like steps. At 527, the interval in timestamps between Sensor A and a host is detected. At 532 any interval between timestamps between Sensor B and a host is detected. Based on these intervals, at 535 a determination is made as to whether any adjustment between the respective sensors and the host is required. If not, detection continues at 527. If so, then the best adjustment which may be made is calculated at 541. In FIG. 5B, no direct detection between Scanner A and Scanner B is used. By syncing both Scanner A and Scanner B to the host device, both scanners are logically synched to each other.

FIG. 5C is yet another alternative whereby one sensor, in this example Sensor A, is synced to the host and subsequent adjustments are made to Sensor B by, for example, the microcontroller 32. At 527, the interval in timestamps between Sensor A and a host is detected and whether an adjustment is required is determined at 525. If an adjustment between Sensor A and the host is required, then at 542 the adjustment is calculated and applied at 544. Next, or if no adjustment is required to Sensor A at 535a, the interval between Sensor B and Sensor A is determined at 525a. At 535b, a determination is made as to whether an adjustment is required to sync Sensor B to Sensor A, the adjustment calculated at 542b and at 560 the processor 32 makes the adjustment to the wait interval of Sensor B.

FIG. 6 illustrates the process for detecting the interval in a change between respective sync rates of two scanners, or a scanner and a capture device which may be performed at steps 525 or 527 in FIG. 5. At 605, when a frame is received from a scanner, a host time reference stamp may be added at 605. At 610, two frames are detected from respective scanners A and B, or from a scanner and a capture or host device. The first frame N has a time stamp T1 and a second frame N has a time stamp T2. At 615, a calculation of the interval between the frames is made comparing T1 to T2. The differences between each of the frame time stamps and a host reference time are calculated and those differences are compared to a target deviation. At 620 the interval is output for use in subsequent processing by the technology.

It should be recognized that the calculation of the interval between each of Scanner A and Scanner B, or Scanner A or B relative to the host, is the same as to any two input frames or timestamps at 610.

FIG. 7 illustrates a method for determining whether or not to make an adjustment which may be performed at steps 530 in FIG. 5. In certain cases, deviations between either first or second sensors or between the sensors and the host device are acceptable. FIG. 7 addresses situations where trade-offs are necessary between acceptable goals and need to have the devices in sync. At 625, a determination is made as to whether or not the deviation between either sensor A and sensor B, or either sensor and the host reference rate, is acceptable. If the deviation is acceptable, no further action is required at 675. If the deviation is not acceptable, certain situations may allow the system to wait for a re-sync between the respective intervals. At 630, the system may determine that the deviation is a result of one or more conditions which will rectify themselves in the acceptable future. For example, in certain cases, the video output will be affected by the complexity of the scene being rendered such that a drop in the video output will occur. In such situations, the system may be aware that another drop is likely to occur which will provide a natural re-sync at a future point in time. Hence, at 630, the system may determine to wait for a re-sync for some given period of time. Alternatively, the system chose to employ a different synchronization heuristic during the period in which it waits for a re-sync. For example, one may choose to refine synchronization to a new, out-of-phase, target to thus improve timing should a natural re-sync occur. If waiting for a re-sync is not acceptable, at 635 a determination is made as to whether or not the system is conducting an operation where a non-sync between the components is acceptable. For example, if the system is in a calibration mode, adjustment may be prevented to allow the calibration to complete and a re-calibration to occur. If the operation is not in a non-sync acceptable mode, then an offset instruction is calculated at 650.

Figure 8:
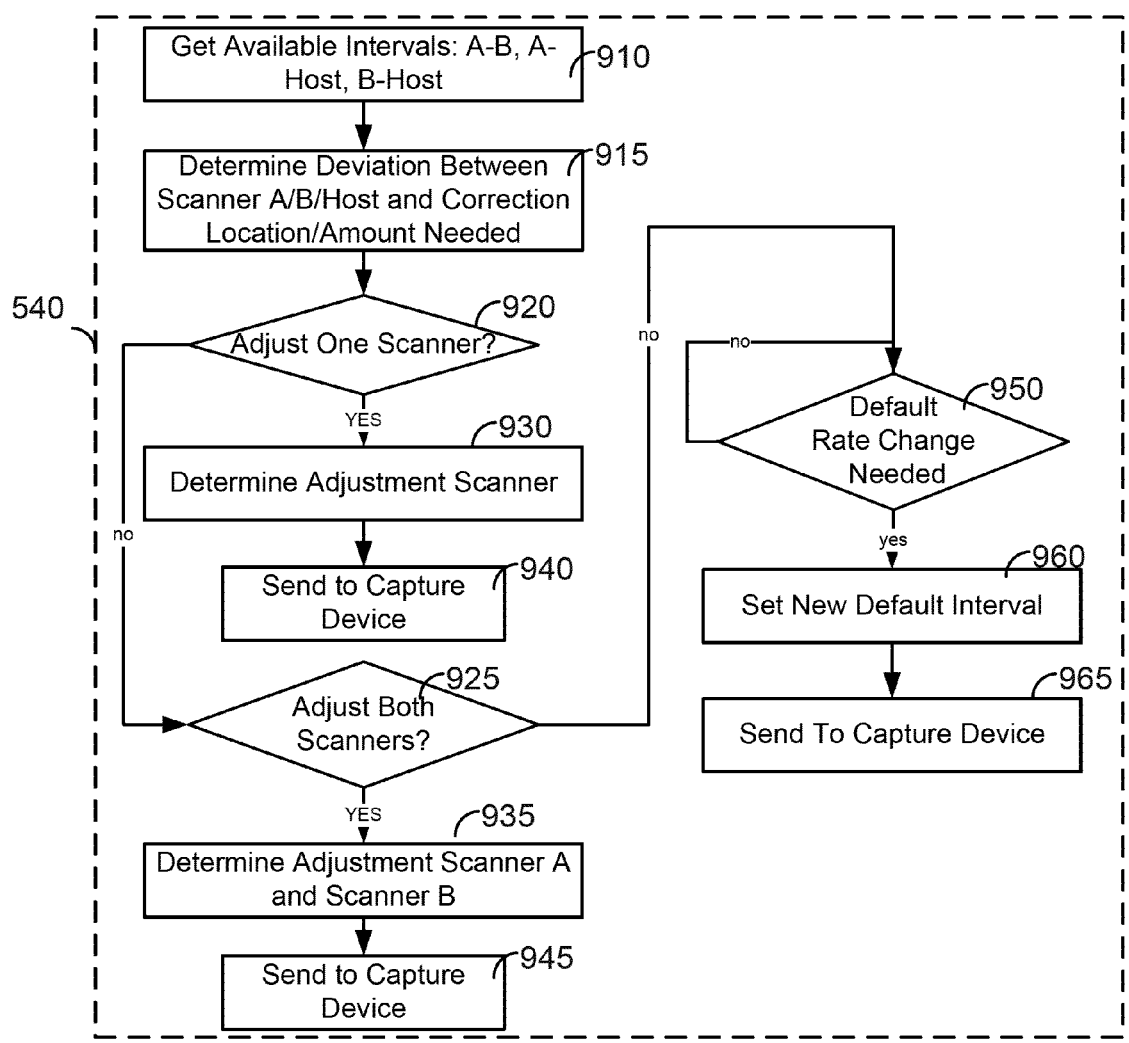
FIG. 8 is a flowchart illustrating a method for determining whether input scanners are synced to a host reference.

FIG. 8 represents the steps which may occur at step 620 or 840 to calculate the adjustment necessary to the wait interval of one or both sensors. At step 910, the deviation is determined. The deviation may be a timing difference between the first and second sensors, or between one or both sensors and the computing device reference, such as the video output rate. At step 915, given the deviations (if any) between Sensor A, Sensor B and the host, a correction is determined. The correction may include adjusting one sensor, adjusting both sensors or adjusting the host, either temporarily or permanently. The adjustment may be determined based on the most efficient method of inserting an interval to achieve synchronization between the components. The correction location identifies which of the sensors, or both sensors, where the correction is to be inserted. At step 920, a determination is made as to whether or not it is necessary to adjust one of the two sensors. If so, a determination of the amount of adjustment for the particular wait interval of sensor A or sensor B is made at 930, and then an instruction is sent to the sensor device at 940 to execute the adjustment. As described below, the adjustment insertion may occur for one or more wait interval(s) of one sensor, or may occur for one or more wait interval(s) of two sensors. In the case of a temporary adjustment, the insertion may occur to introduce an adjustment for a set of N frames followed by the insertion of another adjustment to restore the interval back to the prior default. At 925 a determination is made as to whether it is necessary to adjust both sensors. If so, a determination of the amount of adjustment for the individual wait interval(s) of both sensor A and sensor B is made at 935, and then an instruction is sent to the sensor device at 945 to execute the adjustment.

If at least one sensor does not need a temporary adjustment, the deviation may require that a permanent change in the default vertical blanking interval is required at step 950. In the case of a permanent adjustment, the insertion changes the default for all subsequent frames. If a default change is required, then a new default vertical interval is set at 960.

In each of the above instances where an adjustment is required, the adjustment may be implemented by the host forwarding an instruction to the microcontroller to insert the adjustment in a wait interval between successive frames of the sensor to be adjusted, with the specific insertion frame selection left to the microcontroller.

Figure 9:
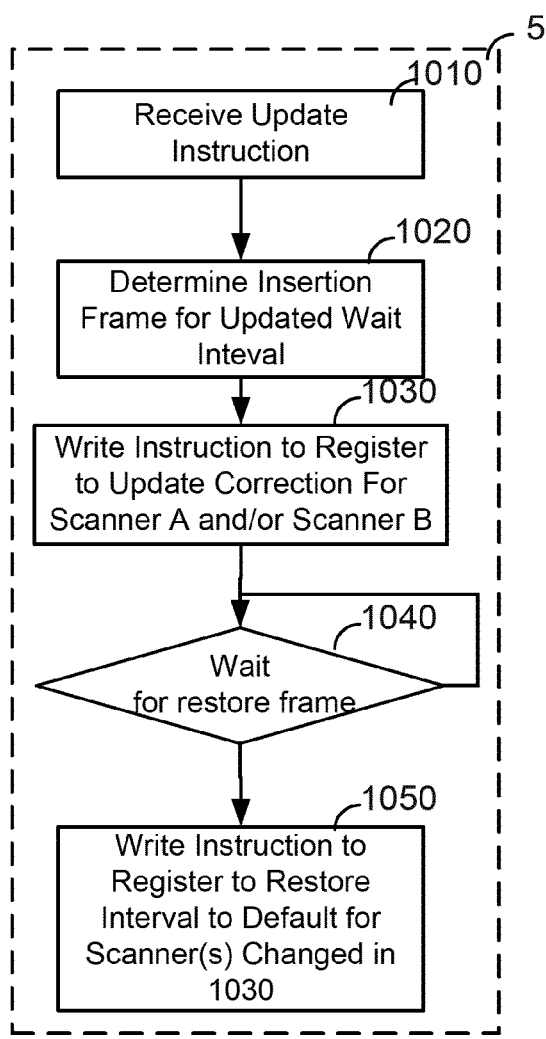
FIG. 9 is a flowchart illustrating a method for determining whether to adjust one or more scanners.
Figure 10:
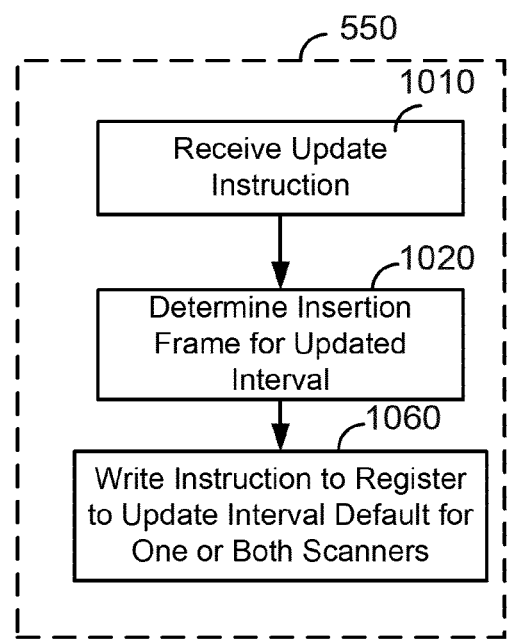
FIG. 10 is a flowchart illustrating a method to update to a default rate.

FIGS. 9 and 10 represent a process which may occur on the capture device when an instruction is received in accordance with step 960. FIG. 9 represents a temporary update to a wait interval of a one or more sensors, while FIG. 10 represents an update to a default rate. While FIG. 9 represents a temporary update, it should be understood that FIG. 9 is merely exemplary. That is, performing a one-time update does not necessarily imply a single sensor and a permanent default update does not imply both sensors. A one-time update instruction may be received by the microcontroller directing it to modify the a vertical blanking interval of both sensors, in which case it may determine the appropriate (and likely differing) windows of opportunities to update each sensor, write to registers of each in turn at the determined times, and later restore each to their respective defaults. Conversely, a permanent default update may be made to only one of the sensors in an update instruction, leaving the other unchanged. At step 1010, the update instruction is received from the processing device. At step 1020, the microcontroller on the capture device will determine a frame in advance of the currently captured frame where an insertion of the wait interval may occur. Because the micro controller is calculating the active regions, the micro controller needs to update a register in the sensor with a certain window of opportunity. Sensors such as those described above operate by writing instructions to a data register to change the vertical blanking interval. When the micro controller determines that an active frame occurs, it can write an instruction to the register to update the vertical blanking interval as a one-time change to the default rate of the interval at 1030. Upon receipt of the next frame at 1040, the micro controller will write an instruction to reset the rate to the original default rate, so that successive frames will be received at the default rate.

FIG. 10 illustrates a change in the default rate of the vertical blanking interval of sensor A and/or sensor B. At 1010, an update instruction will be received and at 1020, the determination is made as to which frame to insert the updated wait interval. At 1060, an instruction is written to the register to update the default wait interval for one or both sensors. In this instance, the instruction will occur for both sensors and will not be re-written or reset as in steps 1040 or 1050 above.

FIG. 11 illustrates how blanking is added to a first sensor, Sensor 1, to make the frame time for each frame the same. Sensor 1 and sensor 2 have two different resolutions. For example, sensor 2 may be a 1080p and sensor 1 may be a 720p. At 1110, a determination is made to insert a vertical blanking interval into blanking interval 1120 at frame 1112. As illustrated therein frame 1120 has a longer vertical blanking interval than blanking interval 1105 or 1140. In this example, the micro controller had determined that the insertion point for an adjustment to Sensor 1 was for frame 1112 and for blanking interval 1120, and the reset point 1130 was for frame 1114 and blanking interval 1140. As illustrated at 1116, the active frames of respective sensors 1 (1150) and 2 (1165) are now aligned.

Likewise, as illustrated in FIG. 12, a shorter blanking interval (1225) may be inserted to perform an adjustment. FIG. 12 illustrates that the vertical blanking interval may be shortened as at 1215, rather than lengthened as at 1120. The insertion correction point was targeted for a frame 1208 and for Sensor 2 at the frame beginning at 1200. The interval is returned to default at 1235 at frame 1212.

Figure 13:
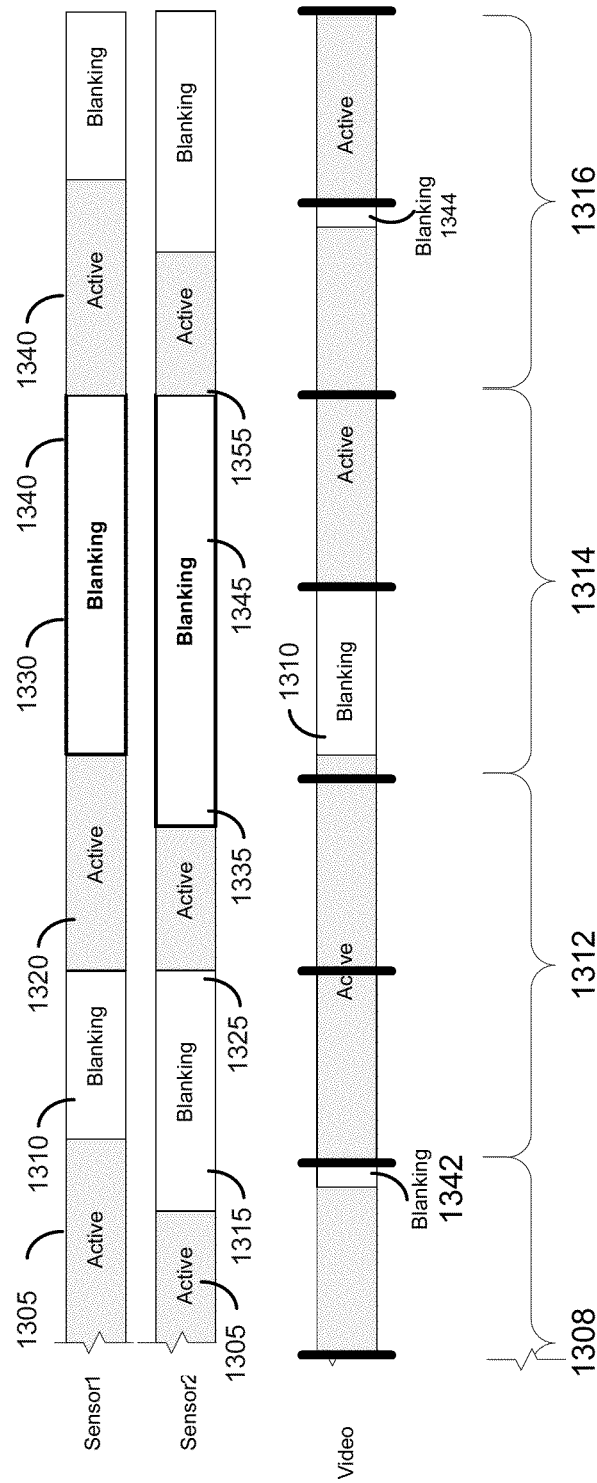
FIG. 13 is a flowchart illustrating insertion of a correction interval into the video output stream of a display system.

Still further, correction may be made to respond to a change or dropped frame in the output rate as illustrated at FIG. 13. In FIG. 13, the vertical blanking interval of the output video stream is adjusted by inserting a blanking interval 1310 in the output stream 1300. In FIG. 13, the sensors are responding to a change in video output rate (e.g a 'dropped frame') by making a one time increase to sensor blanking. At 1350, the host takes too long in rendering and misses an output vblank which should appear near the end of the frame (similar to output blankings 1342, 1344, waiting until the next frame 1214 to display the blanking at 1310. This introduces a timing deviation of one vblank period in the synchronization between sensors and video output. In response, sensor blanking is increased by the duration of one vblank period in 1230 and 1235.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A computer-readable storage device including instructions for programming a processor to execute the instructions, the instructions when executed comprising:
   receiving a first series of image capture frames at a first frequency from a depth image sensor, each frame having first timing information associated with each of the first series, and a second series of image capture frames at a second frequency, different from the first frequency, from a RGB image sensor, each frame having second timing information associated with each of the second series;
   rendering a video output comprising a series of output frames, each frame in the output series having third timing information and correlated to one or more of the first series of image capture frames and one or more of the second series of image capture frames;
   determining whether the first timing information, the second timing information, and third timing information require an adjustment between the first sensor, the second sensor and the video output;
   determining a correction for said adjustment; and
   applying a one-time correction to increase or decrease a default length of one or more vertical blanking intervals between successive frames in one or more of the first series, the second series or the video output, and resetting the default length to a default value upon receipt of next successive frames.

2. The computer-readable storage device of claim 1 wherein the first series of image capture frames includes a vertical blanking interval, the second series of image capture frames includes a vertical blanking interval and the video output includes a third vertical blanking interval, and the determined correction is generated by changing the vertical blanking interval at a first frame in the stream and resetting the vertical blanking interval to the default length of the vertical blanking interval at a successive frame in the stream.

3. The computer-readable storage device of claim 2 wherein the first sensor and the second sensor are provided in a capture device and applying a one-time correction comprises providing an instruction to the capture device to insert the correction into the vertical blanking interval in the successive frames of the first or second series.

4. The computer-readable storage device of claim 3 wherein applying a one-time correction comprises inserting a single longer length vertical blanking interval than the default length of vertical blanking interval between successive frames of the first or the second series.

5. The computer-readable storage device of claim 3 wherein applying a one-time correction comprises inserting a single shorter length vertical blanking interval than the default length of vertical blanking interval between successive frames of the first or the second series.

6. The computer-readable storage device of claim 3 wherein applying a one-time correction comprises inserting a single longer or shorter length vertical blanking interval than the default length of vertical blanking interval between successive frames of the video output.

7. The computer-readable storage device of claim 3 wherein determining whether an adjustment is required comprises applying timing information based on the video output to each of the first video stream and second video stream, and comparing said timing information to timing information applied to each stream by the first or the second sensor.

8. The computer-readable storage device of claim 3 wherein determining whether an adjustment is required comprises detecting a deviation in timing information between the video output and one or both of the first video stream and second video stream, and determining whether the adjustment is required based on whether a deviation in the timing will correct itself.

9. An image capture system, comprising:
   a capture device including a depth image sensor and an RGB image sensor, the capture device coupled to a host device, the host device providing a video output;
   the host device including a processor programmed to:
   receive a first series of image capture frames at a first frequency from a depth image sensor, each frame having first timing information associated with each of the first series, and a second series of image capture frames at a second frequency, different from the first frequency, from a RGB image sensor, each frame having second timing information associated with each of the second series;
   receive a video output comprising a series of output frames, each frame in the output series having third timing information and correlated to one or more of the first series of image capture frames and one or more of the second series of image capture frames;
   determine whether the first timing information, the second timing information, and third timing information require an adjustment between the first sensor, the second sensor and the video output; and
   increase or decrease a default length of one or more vertical blanking intervals between successive frames in one or more of the first series, the second series or the video output by applying a one-time correction, and reset the default length to a default value upon receipt of next successive frames.

10. The capture system of claim 9 wherein the first series of image capture frames includes a vertical blanking interval, the second series of image capture frames includes a vertical blanking interval and the video output includes a third vertical blanking interval, each vertical blanking interval includes a default interval, and the determined correction is generated by changing the vertical blanking interval at a first frame in the stream and resetting the vertical blanking interval to the default interval at a successive frame in the stream.

11. The capture system of claim 10 wherein the first sensor and the second sensor are provided in a capture device and generating a correction comprises providing an instruction to the capture device to insert the correction into the vertical blanking interval in the successive frames of the first or second series.

12. The capture system of claim 10 wherein applying a one-time correction comprises inserting a single longer length vertical blanking interval than the default length of vertical blanking interval between successive frames of the first or the second series.

13. The capture system of claim 10 wherein applying a one-time correction comprises inserting a single shorter length vertical blanking interval than the default length of vertical blanking interval between successive frames of the first or the second series.

14. The capture system of claim 10 wherein applying a one-time correction comprises inserting a single longer or shorter length vertical blanking interval than the default length of vertical blanking interval between successive frames of the video output.

15. The capture system of claim 10 wherein determining whether an adjustment is required comprises applying timing information based on the video output to each of the first video stream and second video stream, and comparing said timing information to timing information applied to each stream by the first or the second sensor.

\* \* \* \* \*